United States Patent
Kurabayashi

(10) Patent No.: US 10,478,722 B2
(45) Date of Patent: Nov. 19, 2019

(54) SERVER AND PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 15/878,252

(22) Filed: Jan. 23, 2018

(65) Prior Publication Data

US 2018/0147485 A1 May 31, 2018

Related U.S. Application Data

(63) Continuation of application No. PCT/JP2016/071303, filed on Jul. 20, 2016.

(30) Foreign Application Priority Data

Jul. 23, 2015 (JP) .................................. 2015-145543

(51) Int. Cl.
*A63F 13/35* (2014.01)
*A63F 13/798* (2014.01)
(Continued)

(52) U.S. Cl.
CPC .............. *A63F 13/35* (2014.09); *A63F 13/67* (2014.09); *A63F 13/798* (2014.09); *A63F 13/46* (2014.09); *H04L 67/10* (2013.01)

(58) Field of Classification Search
CPC .......... A63F 13/35; A63F 13/45; A63F 13/46; A63F 13/533; A63F 13/798; H04L 67/10
(Continued)

(56) References Cited

U.S. PATENT DOCUMENTS

2005/0003882 A1* 1/2005 Nara ........................ G07F 17/32
  463/16
2008/0076527 A1* 3/2008 Low ........................ G07F 17/32
  463/25
(Continued)

FOREIGN PATENT DOCUMENTS

JP    2003-093746 A    4/2003
JP    2004-126853 A    4/2004
(Continued)

OTHER PUBLICATIONS

International Search Report issued in PCT/JP2016/071303, dated Oct. 11, 2016 (2 pages).
(Continued)

*Primary Examiner* — Allen Chan
(74) *Attorney, Agent, or Firm* — Osha Liang LLP

(57) ABSTRACT

A ranking rank identification unit identifies a rank of a participant for each of a plurality of kinds of ranking criteria. A predicted rank calculation unit of a ranking criterion recommendation unit calculates predicted ranks for at least some of the plurality of kinds of ranking criteria for the case where a subject player participates in the individual ranking criteria. A recommended ranking criterion determination unit determines, as recommended ranking criteria, ranking criteria to be recommended to the subject player on the basis of the predicted ranks. A recommendation result presentation unit presents the recommended ranking criteria to the player terminal of the subject player.

5 Claims, 12 Drawing Sheets

(51) Int. Cl.
  *A63F 13/67* (2014.01)
  *A63F 13/46* (2014.01)
  *H04L 29/08* (2006.01)
(58) Field of Classification Search
  USPC .......................................................... 463/42
  See application file for complete search history.

(56) References Cited

U.S. PATENT DOCUMENTS

2012/0322561 A1\* 12/2012 Kohlhoff ................. A63F 13/10
  463/42
2015/0105153 A1\* 4/2015 Xu ........................ A63F 13/795
  463/31

FOREIGN PATENT DOCUMENTS

| JP | 2006-192142 A | 7/2006 |
| JP | 2010-061624 A | 3/2010 |
| JP | 2014-008082 A | 1/2014 |

OTHER PUBLICATIONS

Written Opinion issued in PCT/JP2016/071303, dated Oct. 11, 2016 (4 pages).
Notification of Reasons for Refusal issued in corresponding Japanese Application No. 2015-145543, dated Dec. 15, 2015 (7 pages).
SUKUFESU Border anticipation of 19th score match, and transition [Eri \*\*\*\*\*\* event] The love live !, SUKUFESU . Raburaibu school idle festival news flash / capture .com, [online], Jul. 2015 . Five days, [Dec. 2015 . The four-day search], Internet <URL.: http.:// SUKUFESU news flash.com/.

\* cited by examiner

| User ID | Ranking Criteria ID | Begin | End |
|---|---|---|---|
| U00000001 | R012 | 2015/02/01 00:00:00:00 | 2015/02/07 23:59:59:00 |
| U00000002 | R237 | 2015/02/01 00:00:00:00 | 2015/02/28 23:59:59:00 |
| ... | ... | ... | ... |
| U99999999 | R999 | 2015/02/01 00:00:00:00 | 2015/02/07 23:59:59:00 |

FIG. 5

```
Log = {
    event_type,
    timestamp,
    contents: {
        key1=value1,
        key2=value2,
        ...,
        keyx=valuex
    }
}
```

FIG. 6

```
Log1 = {
    event_type: battleAttack,
    timestamp: 2015/02/02 21:36:59:23,
    contents: {
        character: player character 1,
        characterAttribute: water attribute,
        targetEnemy: enemy monster 2,
        damage: 2100
}}
```

FIG. 7

```
Log2 = {
    event_type: battleHeal,
    timestamp: 2015/02/02 21:37:11:43,
    contents: {
        character: player character 2,
        characterAttribute: light attribute,
        target: player character4,
        method: healing magic
        heal: 1000
}}
```

FIG. 8

```
Rank = {
    duration_begin,    // A 64-bit integer indicating a start time of an aggregation target duration
    duration_end,      // A 64-bit integer indicating an end time of the aggregation target duration
    targets: {attribute_1, attribute_2, ···, attribute_n},  // An array of character strings indicating attributes to be aggregated
    query: {key_1 = value_1, key_2 = value_2, ···, key_x = value_x}, //Key-value pairs for specifying
                                                                     conditions for logs to be aggregated
    bonus: {target, effect}
}
```

FIG. 9

```
Rank1 = {
    2015/02/01 00:00:00:00,
    2015/02/07 23:59:59:00,
    targets: {damage},
    query: {event_type = battleAttack,
            characterAttribute = water attribute
           }
    bonus: {item, +healing item A}
}
```

FIG. 10

|            | 1st | 2nd | 3rd | ... | n-th |
|------------|-----|-----|-----|-----|------|
| 2015/01/01 | 100 | 90  | 87  | ... | 32   |
| 2015/01/02 | 90  | 89  | 86  | ... | 23   |
| ...        | ... | ... | ... | ... | ...  |
| yyyy/mm/dd | 126 | 110 | 100 | 97  | 40   |

FIG. 12

```
DamageTypeRankingTemplate = {
    title: User of %ATRRIBUTES%
    description: ranked according to a cumulative total of damage points given by using a %ATRRIBUTES% weapon/ability
    targets: {damage},
    query: {event_type = battleAttack,
    characterAttribute = %ATRRIBUTES% }
    bonus: {item, +healing item A}
}
```

FIG. 13

```
CharacterDamageTypeRankingTemplate = {
  title: Activity of %CHARACTERS%
  description: ranked according to a cumulative total of damages given to enemies by %CHARACTERS%
  targets: {damage},
  query: {event_type = battleAttack,
          character = %CHARACTERS%
         }
  bonus: {experience points, + 5000}
}
```

FIG. 14

```
CharacterHealTypeRankingTemplate = {
  title: Mercy given by %CHARACTERS%
  description: ranked according to a cumulative total of HPs healed by %CHARACTERS%
  targets: {heal},
  query: {event_type = battleHeal,
          character = %CHARACTERS%
         }
  bonus: {experience points, + 5000}
}
```

FIG. 15

SERVER AND PROGRAM

TECHNICAL FIELD

The present invention relates to a server and a program.

BACKGROUND ART

As games that can be executed on terminals such as smartphones, in the related art there are games in which a plurality of players can participate, such as multi-battle games (e.g., see Patent Literature 1).

Most of these games are provided with a ranking function. In other words, the ranking function is a basic and essential function for these games.

CITATION LIST

Patent Literature

{PTL 1}

Japanese Unexamined Patent Application, Publication No. 2006-192142

SUMMARY OF INVENTION

Technical Problem

However, in existing games, only rankings using a single ranking criterion such as a daily ranking or an overall ranking are provided. It is no exaggeration to say that most higher ranking players in the rankings in existing games are so-called heavy players.

Thus, in existing games, the ranking function is not very familiar to most casual players.

Thus, in order to link the ranking function to the excitement of games for a wide range of players, it is required to establish a technology that motivates each player to participate in rankings.

The present invention has been made in view of the situation described above, and it is an object thereof to establish a technology that motivates each player to participate in rankings.

Solution to Problem

In order to achieve the above-described object, a server according to an aspect of the present invention is a server that individually communicates with a plurality of terminals that can execute a game by accepting an operation performed individually by a plurality of players, manages a plurality of kinds of ranking criteria in which at least one of the plurality of players participates as a participant, and calculates ranking of the participant for each of the plurality of kinds of ranking criteria, the server including:

a prediction means that sets, among the plurality of players, a player who is to be a subject of processing as a subject player and calculates, as predicted ranks, ranks with respect to at least some of the plurality of kinds of ranking criteria for the case where the subject player participates in the individual ranking criteria;

a determination means that determines, as recommended ranking criteria, ranking criteria to be recommended to the subject player on the basis of the predicted ranks; and a presentation means that presents the recommended ranking criteria to the terminal of the subject player.

Advantageous Effects of Invention

The present invention makes it possible to establish a technology that motivates each player to participate in rankings.

BRIEF DESCRIPTION OF DRAWINGS

FIG. 5 is a diagram showing an example of a structure of a participation ranking criterion DB in the server in FIG. 3.

FIG. 6 is a diagram showing an example of the structure of a general log database, namely, a log structure.

FIG. 7 is a diagram showing a specific example of a single entry in a log with the log structure in FIG. 6.

FIG. 8 is a diagram showing a specific example of a single entry of a log with the log structure in FIG. 6, the entry being generated in the case where a player heals the physical power of a fellow character by using a healing spell or a healing item.

FIG. 9 is a diagram showing a specific example of the implementation of a ranking criterion, that is, an example of a rank structure.

FIG. 10 is a diagram showing a specific example of a single entry for a ranking criterion with the rank structure in FIG. 9.

FIG. 12 is a diagram showing an example of time-series information of past score logs related to a subject ranking criterion.

FIG. 13 is a diagram showing an example of a template for automatically generating a ranking criterion related to damage in a game.

FIG. 14 is a diagram showing an example application that is different from the example in FIG. 13, that is, an example of a type of template in which a player who has achieved mastery of a specific character is ranked higher.

FIG. 15 is a diagram showing an example application that is different from the examples in FIGS. 13 and 14, that is, an example of a template for automatically generating a ranking criterion that uses a score not related to damage.

DESCRIPTION OF EMBODIMENTS

An embodiment of the present invention will be described below with reference to the drawings.

It is to be understood that what are simply referred to as "images" hereinafter should be construed to include both "moving images" and "still images."

Furthermore, "moving images" should be construed to include images that are displayed individually through the following first processing to third processing.

First processing refers to processing for displaying a series of a plurality of still images, while continuously switching among them as time passes, for individual actions of objects (e.g., game characters) in planar images (2D images). Specifically, two-dimensional animation, i.e., processing similar to what is called book flipping, is an example of first processing.

Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing.

Third processing refers to processing for preparing videos (i.e., moving images) corresponding to individual actions of objects (e.g., game characters) and playing back the videos as time passes.

Figure 1:
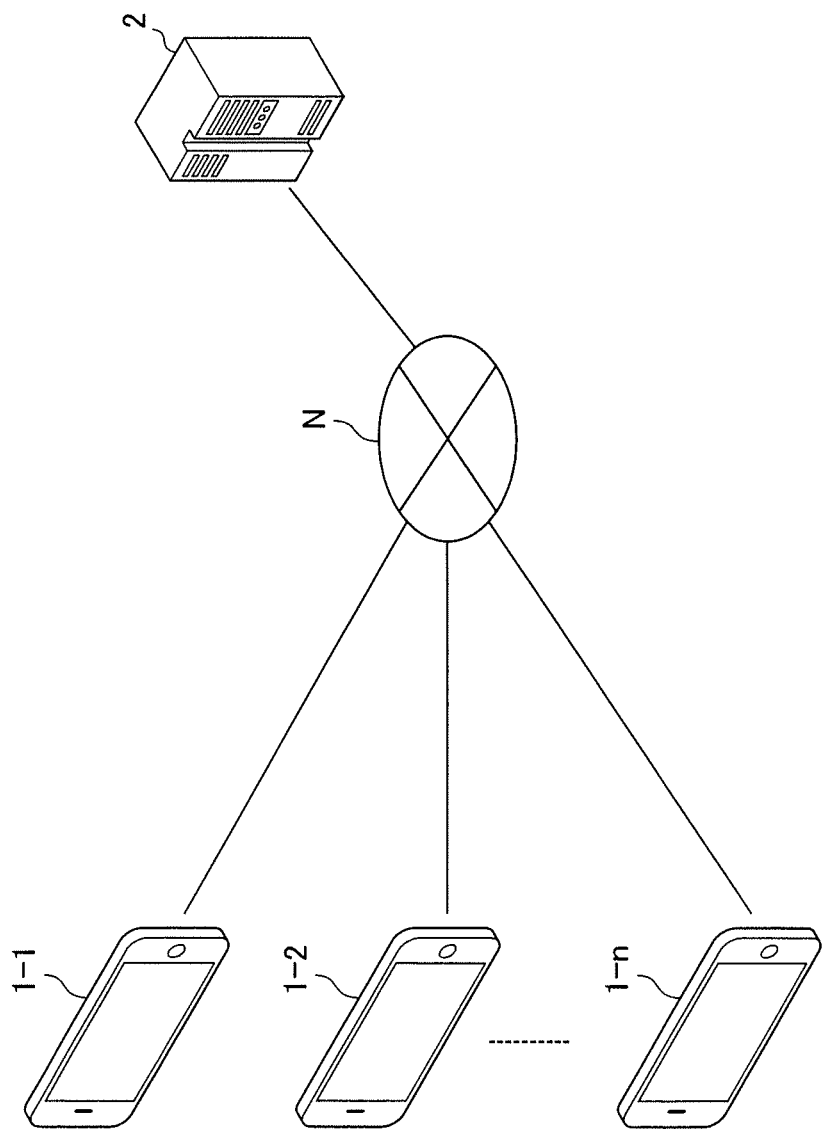
FIG. 1 is a block diagram showing the configuration of an information processing system according to an embodiment of the present invention.

FIG. 1 shows the configuration of an information processing system according to an embodiment of the present invention.

The information processing system shown in FIG. 1 is a system including: player terminals 1-1 to 1-n individually used by n players (n is an arbitrary integer greater than or equal to 1); and a server 2. The individual player terminals 1-1 to 1-n and the server 2 are connected to each other via a prescribed network N, such as the Internet.

The server 2 provides the individual player terminals 1-1 to 1-n with a game execution environment to provide various kinds of services relating to a game that is executed at the individual player terminals 1-1 to 1-n. As one of these services, in this embodiment, a new ranking function service that uses various ranking criteria is adopted.

Hereinafter, in the case where there is no need for distinction among the individual player terminals 1-1 to 1-n, these will be referred to collectively as "player terminals 1."

Figure 2:
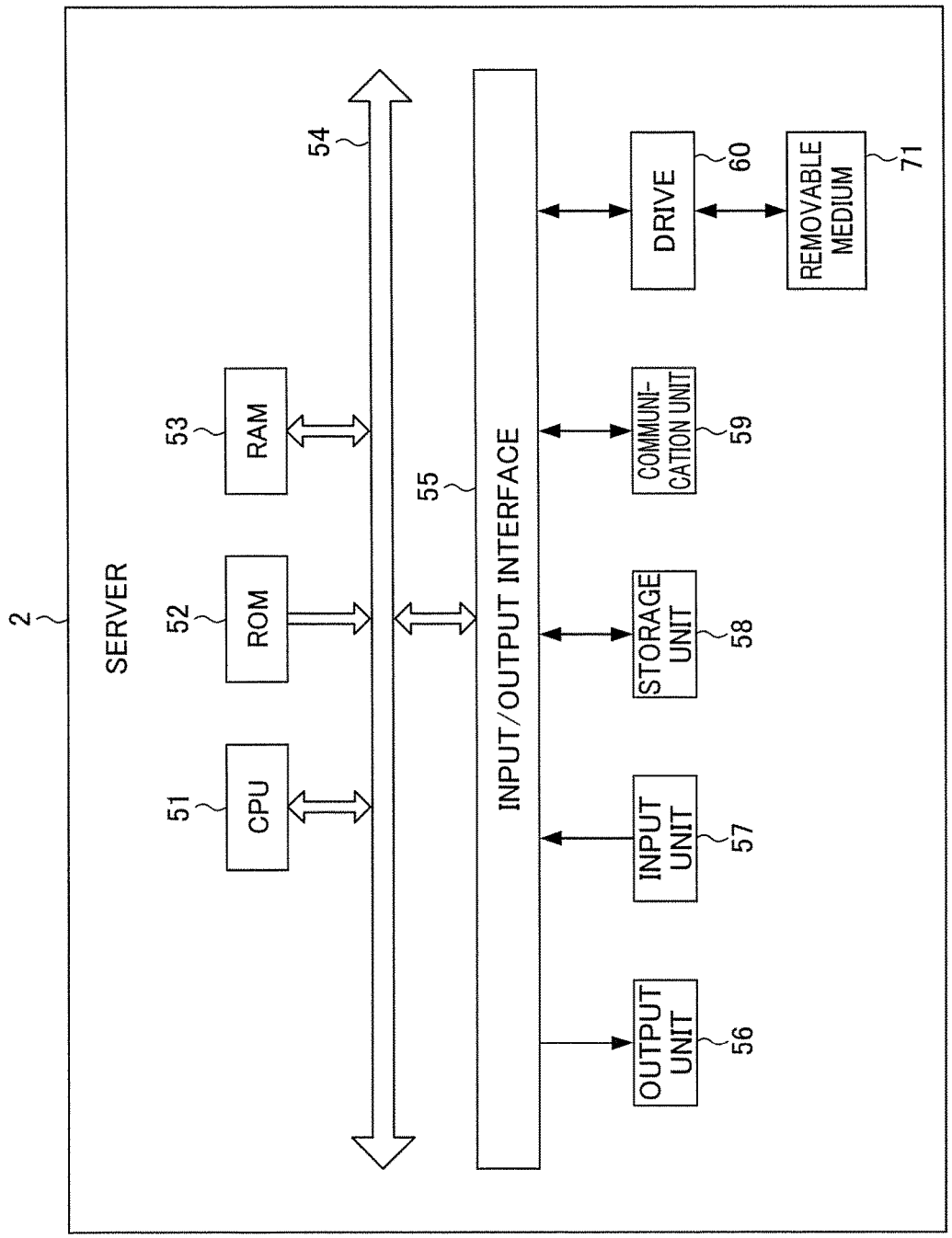
FIG. 2 is a block diagram showing, in the information processing system in FIG. 1, the hardware configuration of a server as an embodiment of a terminal according to the present invention.

FIG. 2 is a block diagram showing, in the information processing system in FIG. 1, the hardware configuration of the server 2 as an embodiment of the present invention.

The server 2 includes a CPU (Central Processing Unit) 51, a ROM (Read Only Memory) 52, a RAM (Random Access Memory) 53, a bus 54, an input/output interface 55, an output unit 56, an input unit 57, a storage unit 58, a communication unit 59, and a drive 60.

The CPU 51 executes various kinds of processing according to programs recorded in the ROM 52 or programs loaded from the storage unit 58 into the RAM 53.

The RAM 53 also stores, as appropriate, data, etc. that are needed for the CPU 51 to execute various kinds of processing.

The CPU 51, the ROM 52, and the RAM 53 are connected to each other via the bus 54. The input/output interface 55 is also connected to the bus 54. The output unit 56, the input unit 57, the storage unit 58, the communication unit 59, and the drive 60 are connected to the input/output interface 55.

The output unit 56 is constituted of a display, a speaker, etc. and outputs various kinds of information in the form of images or audio.

The input unit 57 is constituted of a keyboard, a mouse, etc. and allows input of various kinds of information.

The storage unit 58 is constituted of a hard disk, a DRAM (Dynamic Random Access Memory), etc. and stores various kinds of data.

The communication unit 59 controls communications carried out with other devices (the player terminals 1 in the example in FIG. 1) via the network N, including the Internet.

The drive 60 is provided as needed. A removable medium 71 formed of a magnetic disk, an optical disk, a magneto-optical disk, a semiconductor memory, or the like is placed in the drive 60 as appropriate. A program read from the removable medium 71 by the drive 60 is installed in the storage unit 58 as needed. The removable medium 71 can also store various kinds of data stored in the storage unit 58, similarly to the storage unit 58.

Through cooperation between the various kinds of hardware and various kinds of software on the server 2 side in FIG. 2, it becomes possible to manage or support the execution of a game on the player terminal 1.

In this embodiment, games in which a plurality of players participate, such as multi-battle games, are considered.

In the games considered, a ranking function that uses various ranking criteria is provided.

Thus, among the various ranking criteria, the server 2 determines, as recommendation targets, ranking criteria that suit the play style of a player, sorts the recommendation targets in descending order of relevance, and presents the recommendation targets to the player terminal 1 of the player. This makes it possible to motivate many casual players to participate in rankings.

Here, presuppositions regarding the relationship between players and ranking criteria in a game in this embodiment will be described.

The first presupposition is that an opt-in method is adopted in this embodiment.

That is, conventionally, an opt-out method is adopted. In other words, conventionally, the number of kinds of ranking criteria is one or a small number. Thus, ranking criteria that a player participates in are automatically determined, rankings in the ranking criteria are automatically aggregated, and only whether or not the data about the player is displayed in the rankings can be controlled.

On the other hand, in a game in this embodiment, the number of kinds m of the ranking criteria is as many as several hundred to several thousand. Since it is not realistic for the player to participate in all of the m kinds of various ranking criteria, the player narrows down the ranking criteria to participate in to several ranking criteria.

In this case, in this embodiment, as a method for determining ranking criteria that the player participates in, a method in which the player decides which ranking criteria that he/she wishes to participate in, that is, an opt-in method is adopted, as opposed to a method in which ranking criteria to participate in are automatically determined.

The second presupposition is that, in this embodiment, the maximum number of ranking criteria that a single player can participate in at the same time is predefined.

This makes it possible to prevent an inclination in the number of participants toward only specific ranking criteria. In addition, the number of participants in a ranking criterion can be estimated easily.

The third presupposition is that, in this embodiment, in addition to using existing kinds of ranking criteria, new kinds of ranking criteria can automatically be generated.

That is, as described above, in this embodiment, the number of kinds m of the ranking criteria becomes large, namely, several hundred to several thousand. However, it is not realistic to set all of the m kinds of various ranking criteria manually.

Thus, the server 2 in this embodiment has a function for automatically generating a ranking criterion from existing game data. The method of automatically generating a ranking criterion will be described later.

Under these presuppositions, the server 2 calculates the relevance for n×m combinations of n players (e.g., n=5 million or more) and m kinds of ranking criteria (e.g., m=several hundred to several thousand). Then, the server 2 sorts the ranking criteria for each of the n players in descending order of relevance, and presents the sorting results to the individual player terminals 1-1 to 1-n. In addition, the server 2 presents, among the ranking criteria having higher relevance, the top several ranking criteria to the individual player terminals 1-1 to 1-n as recommendation targets.

This allows each of the n players to easily determine, as ranking criteria to participate in, ranking criteria that suit his/her play style without checking an entire group of ranking criteria.

In short, ranking functions in conventional social games, etc. do not have an automatic recommendation function. Thus, rankings that use only a small number of ranking criteria, namely, one or a few ranking criteria, such as a daily ranking and an overall ranking, are provided.

In contrast, in this embodiment, rankings that use m kinds of various ranking criteria are provided.

Thus, in this embodiment, as a level indicating to what degree a specific ranking criterion suits the play style of a player, a predicted rank for the case where a player who is not currently participating in a ranking criterion participates in the ranking criterion is adopted.

That is, the server 2 calculates a predicted rank for the case where a player who is not currently participating in a ranking criterion participates in the ranking criteria.

In addition, the server 2 sorts the various ranking criteria in descending order of the predicted rank (from higher rank to lower rank), in other words, in descending order of possibility for the player to be ranked higher in the case where the player participates in the ranking criteria. On the basis of the sorting result, the server 2 automatically recommends, for example, the top k (any integer value such as k=5) ranking criteria to the player as, for example, ranking criteria selected by the "automatic selection." That is, the ranking criteria selected by the "automatic selection" are presented to the player terminal 1 of the player.

Thus, it becomes possible for the player to easily participate in ranking criteria in which he/she has competitiveness (i.e., he/she is expected to be ranked higher) without checking all of the numerous m kinds of ranking criteria. This makes it possible to motivate many casual players to participate in rankings.

The series of processing steps in the server 2 as described above, that is, processing steps for calculating relevance between a ranking criterion and a player (a predicted rank for each ranking criterion), sorting ranking criteria on the basis of the calculation results, and presenting predetermined kinds of ranking criteria to the player as recommendation targets will be hereinafter referred to as "recommended ranking criterion presentation processing."

Figure 3:
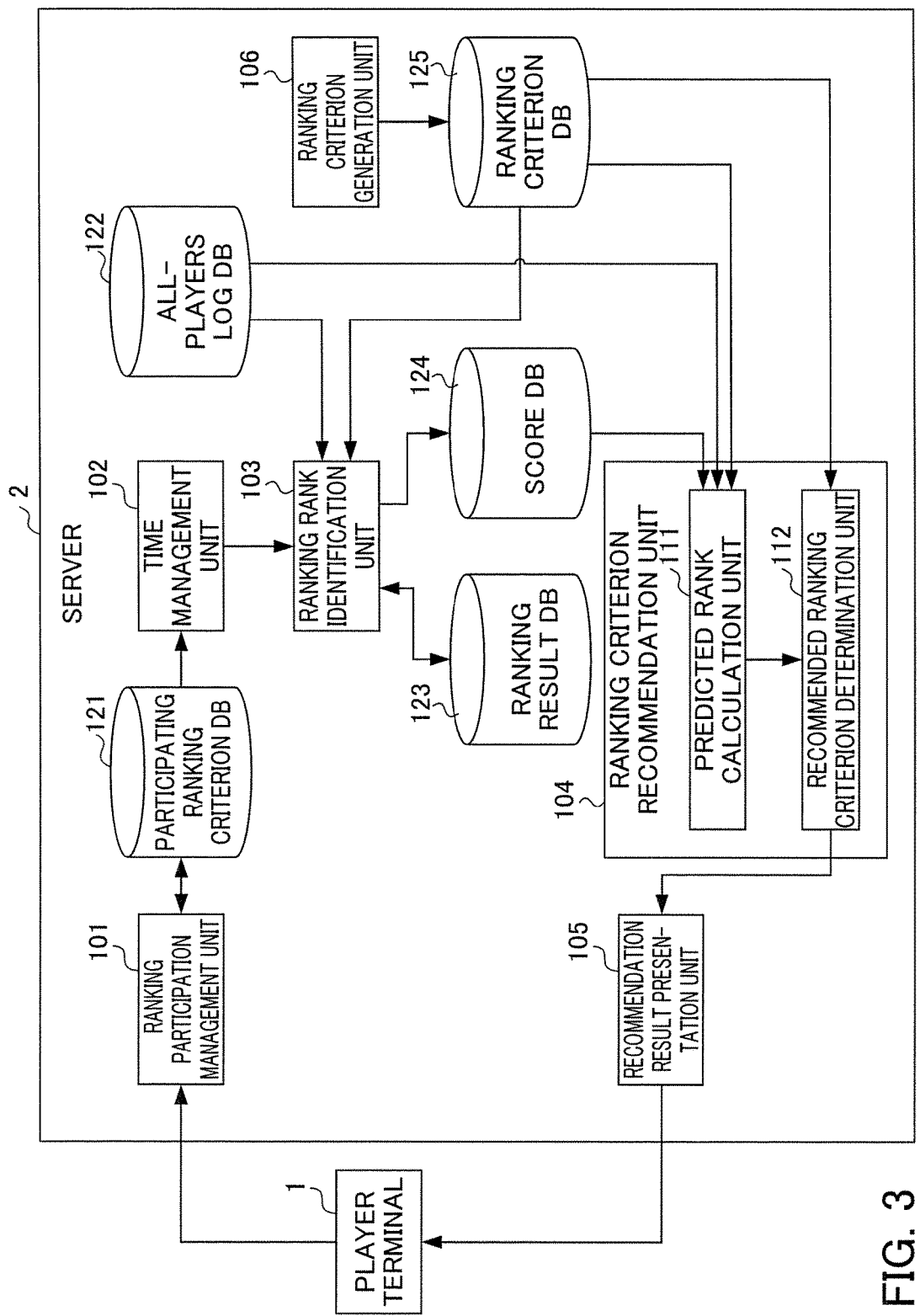
FIG. 3 is a functional block diagram showing an example of the functional configuration of the server in FIG. 2.

FIG. 3 is a functional block diagram showing, in the functional configuration of the server 2, a functional configuration at the time of execution of the recommended ranking criterion presentation processing.

As shown in FIG. 3, the CPU 51 of the server 2 has the functions of a ranking participation management unit 101, a time management unit 102, a ranking rank identification unit 103, a ranking criterion recommendation unit 104, a recommendation result presentation unit 105, and a ranking criterion generation unit 106.

In a region in the storage unit 58 of the server 2, a participating ranking criterion DB 121, an all-players log DB 122, a ranking result DB 123, a score DB 124, and a ranking criterion DB 125 are provided.

The ranking participation management unit 101 manages the status of a player of the player terminal 1 with respect to the participation in ranking criteria.

Figure 4:
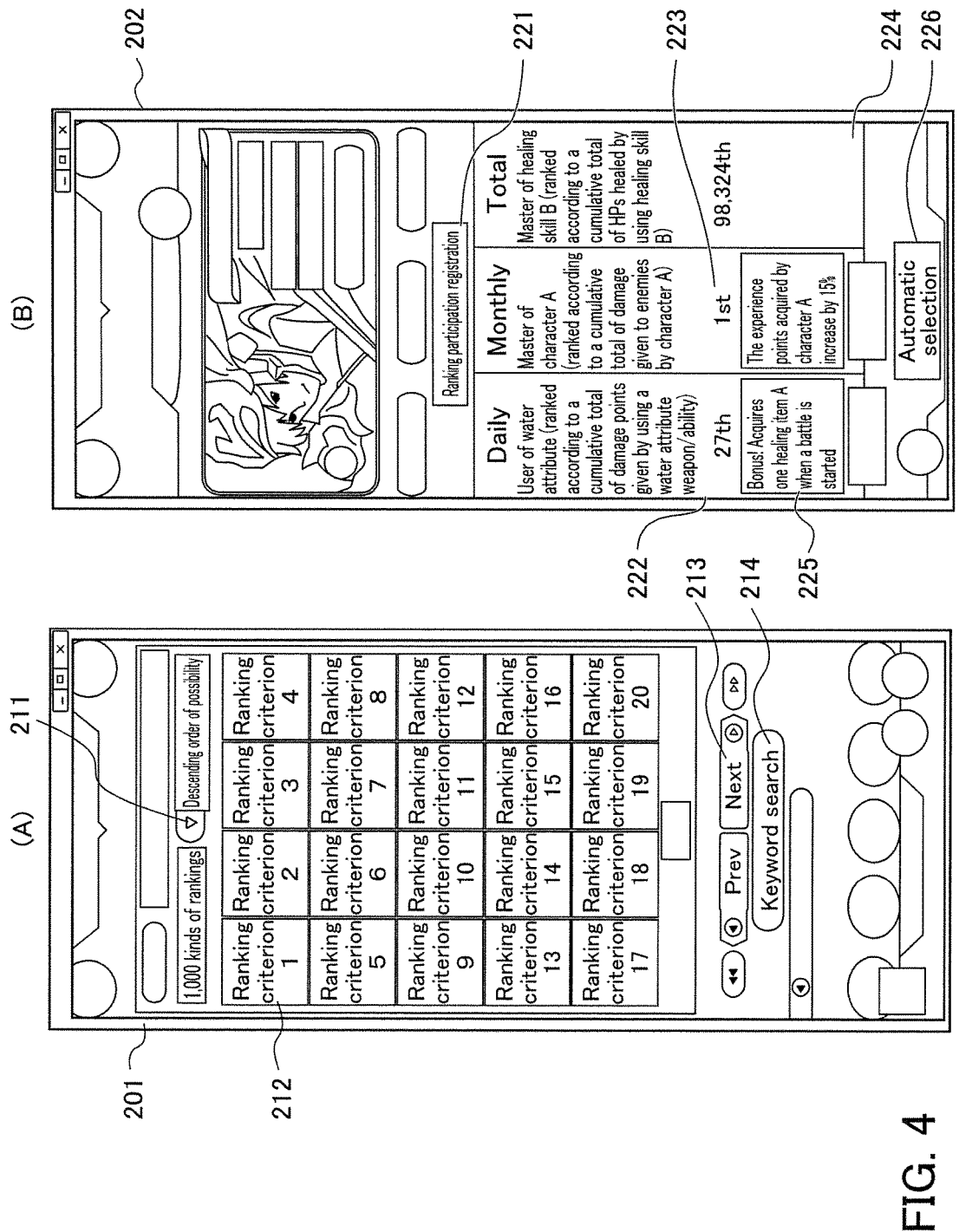
FIG. 4 is an illustration showing an example of a user interface related to players' participation in rankings.

For example, the ranking participation management unit 101 executes control to display, on the player terminal 1 of the player, a user interface as shown in FIG. 4, that is, a user interface related to the participation of the player in ranking criteria.

FIG. 4(A) shows a user interface 201 for selecting ranking criteria that a player participates in from ranking criteria sorted from a specific viewpoint.

The user interface 201 is provided with a selection operation section 211 as a section for selecting "a viewpoint" for sorting ranking criteria. In the example in FIG. 4(A), since "in descending order of possibility" is selected, a plurality of kinds of ranking criteria are sorted in descending order of possibility (for the player to be ranked higher).

Here, the processing for sorting in descending order of possibility (for the player to be ranked higher) is executed by the ranking criterion recommendation unit 104 (FIG. 3), which will be described later. That is, although the details will be described later, simply speaking, the ranking criterion recommendation unit 104 calculates a predicted rank for the case where a player (a subject player, which will be described later) participates in a ranking criterion (a subject ranking criterion, which will be described later). Here, a higher predicted rank (a smaller value) means a higher possibility (for the player to be ranked higher). Thus, the ranking criterion recommendation unit 104 sorts ranking criteria in descending order of the predicted rank (from lower value to higher value), in other words, in descending order of possibility (for the player to be ranked higher).

The result of sorting performed by the ranking criterion recommendation unit 104, as described above, is displayed in a ranking criterion display area 212.

However, it is difficult to display m kinds of various ranking criteria in a single screen. Thus, in the ranking criterion display area 212, a predetermined number of kinds (20 kinds in the example in FIG. 4(A)) of ranking criteria are displayed in a list according to a sorted order from a viewpoint selected in the selection operation section 211. That is, in the example in FIG. 4(A), among the m kinds of ranking criteria sorted in descending order of possibility (for the player to be ranked higher), the top 20 kinds of ranking criteria (icons) are displayed in the sorted order.

To be more precise, as described later, there is no particular need to cause all of the m kinds of ranking criteria to be sorted. However, for convenience of explanation, it is assumed here that all of the m kinds of ranking criteria are to be sorted.

As described above, among the m kinds of ranking criteria, only a limited number of kinds of ranking criteria, such as about 20 kinds of ranking criteria, can be displayed in the ranking criterion display area 212 at the same time. Thus, operation sections 213 for changing items to be displayed in the ranking criterion display area 212 are also provided.

In addition, an operation section 214 for executing a keyword search is also provided such that the player can search for a desired ranking criterion by inputting a specific keyword.

FIG. 4(B) shows a user interface 202 for confirming ranking criteria that a player participates in and displaying explanations of the ranking criteria.

As described above, in this embodiment, an opt-in method in which a player determines ranking criteria to participate in by himself/herself is adopted, and a maximum number of ranking criteria that a player can participate in is predefined.

Then, the player can determine, for example, three kinds of ranking criteria that he/she wishes to participate in by using the user interface 202 in FIG. 4(B). Specifically, the player presses a ranking participation registration button 221. This confirms the participation of the player in the ranking criteria.

In this case, explanation images 222, 223, 224 for ranking criteria that the player participates in are displayed in the user interface 202.

Since each ranking criterion has its own aggregation duration, a preferable implementation is such that, once the player participates in a specific ranking criterion, the player cannot cancel the registration with the ranking criterion during the aggregation duration of the ranking criterion (e.g., 24 hours or a month).

Here, the three kinds of ranking criteria individually represented by the explanation images 222, 223, 224 may be ranking criteria selected by the player from the ranking criterion display area 212 in the user interface 201 shown in FIG. 4(A) or may be ranking criteria automatically selected by the server 2 as a result of an automatic selection button 226 shown in FIG. 4(B) being pressed.

When the latter automatic selection button 226 is pressed, the recommended ranking criterion presentation processing described above is executed, and among the ranking criteria that suit the player, for example, the top three kinds of ranking criteria, that is, three kinds of ranking criteria in which the player has higher possibilities to be ranked higher, are recommended, and the explanation images 222, 223, 224 that show explanations of individual ranking criteria are automatically displayed in the user interface 201.

This makes it possible for the player to easily find out ranking criteria in which he/she has competitiveness without checking all of the numerous m kinds of ranking criteria.

Explanation images 222, 223, and 224 are images that individually include a duration, a ranking condition, and a current rank for each ranking criterion.

For example, the explanation image 222 is an image that shows an explanation of the Daily ranking and includes the explanation content "Daily, User of water attribute weapon (ranked according to a cumulative total of damage points given by using a water attribute weapon/ability), 27th." That is, in the ranking criterion explained in the explanation image 222, a cumulative total of damages given by the player in the past 24 hours by using a water attribute weapon and ability is used as a score to calculate a rank.

Here, a bonus explanation image 225 is an image for explaining the content of a bonus that can be acquired in the case where the player participates in the ranking criterion.

That is, by using the user interface in FIG. 4, the player can register ranking criteria in which the player has higher possibilities to be ranked higher as ranking criteria to participate in and acquire bonuses while playing the game. Giving a bonus depending on a rank in the ranking as described above can increase players' motivation.

To summarize what has been described above, the server 2 in this embodiment can provide m kinds of ranking criteria, the number of which is overwhelmingly more than ever before, to each player, and strongly motivate players to participate in, among these ranking criteria, ranking criteria that suit the play style of each player.

That is, by providing the m kinds of ranking criteria, the number of which is overwhelmingly more than ever before, to each player, it is possible to provide ranking criteria in which even casual players have a chance to be ranked higher depending on their play styles, that is, ranking criteria that suit the play style of each player.

However, it is very difficult for each player to blindly find out ranking criteria that suit his/her play style from the m kinds of ranking criteria, the number of which is overwhelmingly more than ever before.

Thus, the server 2 in this embodiment sorts, for example, m kinds of ranking criteria in order of relevance to the play style of the player, in other words, in order of expectation for the player having such a play style to be ranked higher (to acquire a higher rank) in the case where the player participates in the ranking criteria. It is to be noted that, as described later, the number of kinds to be sorted is not necessarily m kinds.

The sorting result is presented to the player through the user interface 201 in FIG. 4(A). Thus, the player can easily and immediately find out, from the m kinds of various ranking criteria, ranking criteria in which he/she is expected to be ranked higher depending on his/her play style.

In addition, when the player simply presses the automatic selection button 226 in FIG. 4(B), several ranking criteria that suit the play style of the player, in other words, several ranking criteria in which a player having such a play style is expected to be ranked higher (to acquire a higher rank) in the case where the player participates in the ranking criteria are automatically recommended from the m kinds of various ranking criteria.

In this way, it becomes possible for each player to easily and immediately select, from the m kinds of various ranking criteria, ranking criteria in which he/she is expected to be ranked higher depending on his/her play style. This makes it possible to motivate many casual players to participate in rankings.

Referring back to FIG. 3, the participating ranking criterion DB 121 stores, in association with each other, individual players of the player terminals 1-1 to 1-n and ranking criteria that the players participate in.

FIG. 5 shows an example of the structure of the participating ranking criterion DB 121.

In the participating ranking criterion DB 121 in FIG. 5, User ID is an ID with which each player can be identified uniquely. Ranking Criteria ID is an ID with which each ranking criterion can be identified uniquely. By associating User ID and Ranking Criteria ID with each other in the same row, it becomes possible to manage the relevance between a player and a ranking criterion that the player participates in.

Begin in a specific row indicates a score-collection start time for a player in the row with respect to the ranking of the ranking criterion in the row. End in the row indicates an end time of the collection. The score of the player in the row with respect to the ranking criterion in the row is calculated on the basis of play logs recorded within a time period specified by values of Begin and End. Although the details will be described later, the score of a player in a specific ranking criterion is used to determine the rank of the player in the ranking criterion.

Referring back to FIG. 3, the time management unit 102 controls the frequency of score aggregation required to determine a rank for each ranking criterion.

For example, in order to notify a player of the intermediate result of a ranking, it is preferable to update the ranking several times a day even if in the case of the Daily ranking. Thus, the time management unit 102 activates the ranking rank identification unit 103, which will be described later, at a certain time interval, specifically, for example, at a frequency of every four hours for the Daily ranking, etc. That is, the ranking rank identification unit 103 is activated at a certain time interval on the basis of the management by the time management unit 102, and executes processing such as score aggregation (the details of the processing will be described later).

Although not shown in FIG. 3, an aggregation frequency managed by the time management unit 102 may be notified to the player by displaying, for example, "Time remaining for next update: 2 hours", etc. on a player terminal 1 via the ranking participation management unit 101.

Here, the time management unit 102 is not an essential component, and the ranking rank identification unit 103 may perform ranking aggregation in real time. However, as in this embodiment, by providing the time management unit 102 and updating rankings at a certain time interval without performing ranking aggregation in real time, it is possible to reduce the load applied to the system of the server 2 due to the ranking aggregation.

The ranking rank identification unit 103 refers to the participating ranking criterion DB 121, calculates scores for individual ranking criteria that a player who is to be a subject of processing (hereinafter referred to as a "subject player") participates in, and identifies ranks on the basis of the scores.

Specifically, for example, the ranking ran identification unit 103 extracts play logs of the subject player from the all-players log DB 122.

The ranking rank identification unit 103 sequentially sets each of the ranking criteria that the subject player participates in as a ranking criterion that is to be a subject of processing (hereinafter referred to as a "subject ranking criterion"), and iterates the following series of processing steps for each ranking criterion.

The ranking rank identification unit 103 obtains an aggregation method for the subject ranking criterion from the ranking criterion DB 125.

The ranking rank identification unit 103 calculates, according to the obtained score-aggregation method, the score of the subject player with respect to the subject ranking criterion on the basis of the play logs of the subject player. The calculated score is stored in the score DB 124.

The ranking rank identification unit 103 identifies, on the basis of the score, the rank of the subject player with respect to the subject ranking criterion.

That is, by sequentially setting each of the players of player terminals 1-1 to 1-n as a subject player and sequentially setting each of the one or more ranking criteria that the subject player participates in as a subject ranking criterion, a score and a rank with respect to each of the one or more ranking criteria that each of the players participates in are calculated for each player.

The all-players log DB 122 stores, for individual players of the player terminals 1-1 to 1-n, play logs recorded during the game, for example, logs for all activities related to the ranking, such as item use history and battle history in the game. A specific example of the structure of the all-players log DB 122 will be described later with reference to FIGS. 6 to 8.

The ranking criterion DB 125 stores, for each of the m kinds of ranking criteria, various kinds of information such as a score aggregation method. A specific example of the structure of the ranking criterion DB 125 will be described later with reference to FIGS. 9 and 10.

The ranking result DB 123 is a cache database for storing the intermediate calculation result of the ranking aggregation performed by the ranking rank identification unit 103.

That is, in this embodiment, since the all-players log DB 122 becomes a large database containing many play logs, it is not realistic to perform ranking aggregation on an as-needed basis. Thus, the intermediate result of the ranking aggregation at a certain time interval is stored in the ranking result DB 123. When performing score aggregation, the ranking rank identification unit 103 calculates a current score aggregation result by extracting the last aggregation result from the ranking result DB 123 and adding a difference value with respect to the last score aggregation result.

This makes it possible to significantly reduce the load caused by score aggregation.

Specifically, for example, let's suppose that, when 100,000 play logs per minute need to be aggregated, the ranking result DB 123 is not provided and the intermediate result is not to be cached. In this case, since the aggregation cost increases in proportion to time, 8,640,000,000 play logs need to be aggregated at the same time in 24 hours.

On the other hand, in this embodiment that provides the ranking result DB 123, for example, in the case where the intermediate calculation result obtained every hour is to be cached and reused, aggregation of only 360,000,000 play logs needs to be performed 24 times within 24 hours.

The ranking criterion recommendation unit 104 includes a predicted rank calculation unit 111 and a recommended ranking criterion determination unit 112.

For a subject player, the predicted rank calculation unit 111 calculates, as predicted ranks, ranks with respect to at least some of the m kinds of ranking criteria for the case where the subject player participates in the individual ranking criteria.

The recommended ranking criterion determination unit 112 sorts the ranking criteria on the basis of the predicted ranks for the individual ranking criteria, and determines, as recommended ranking criteria, ranking criteria to be recommended to the subject player.

The recommendation result presentation unit 105 presents the sorting result of the ranking criteria and the recommended ranking criteria to the player terminal 1 of the subject player.

It is to be understood that there is no particular limitation to the timing and method for presenting the sorting result of the ranking criteria and the recommended ranking criteria.

In this embodiment, for example, in the user interface 201 in FIG. 4(A) described above, the timing at which the sorting result of the ranking criteria is displayed in the ranking criterion display area 212 is when "in descending order of possibility" is selected in the selection operation section 211.

In addition, for example, the timing at which explanation content for the recommended ranking criteria is displayed as the explanation images 222, 223, and 224 is when the automatic selection button 226 in FIG. 4 is pressed.

The ranking rank identification unit 103, the ranking criterion recommendation unit 104, and the recommendation result presentation unit 105 will be further described below in detail.

As described above, the ranking rank identification unit 103 iterates, for each of the m kinds of ranking criteria, processing in which individual scores of one or more participants participating in a specific ranking criterion are calculated according to a score calculation method (score aggregation method) predefined for the specific ranking criterion, and individual ranks of the one or more participants are identified on the basis of the scores.

The scores calculated for the individual participants are stored in the score DB 124.

That is, the score DB 124 stores the score history of past participants for each of the m kinds of ranking criteria.

Then, the predicted rank calculation unit 111 sequentially sets each of at least some of the m kinds of ranking criteria as a subject ranking criterion, and iterates the following series of processing steps.

That is, the predicted rank calculation unit 111 sets, on the basis of a plurality of past scores in the subject ranking criterion, presumed scores for the 1st place to the n-th place that are presumed as criteria for a predicted rank.

The predicted rank calculation unit 111 calculates a current score of the subject player according to a score calculation method (score aggregation method) predefined for the subject ranking criterion.

The predicted rank calculation unit 111 calculates a predicted rank of the subject player on the basis of the presumed scores for the 1st place to the n-th place and the current score of the subject player.

The method of calculating the predicted rank of the subject player, which has been described in this paragraph, will be described below more specifically with reference to FIGS. 6 to 12.

A feature of the ranking criterion recommendation unit 104 and the recommendation result presentation unit 105 described above is that the relevance between a play style of the subject player and each ranking criterion is automatically calculated from the viewpoint of the predicted rank of the subject player. That is, a ranking criterion in which the predicted rank of the subject player is higher has a higher relevance to the play style of the subject player.

By using this feature as a presupposition, the relationship between play logs, which serve as base data for rankings, and ranking criteria will be described.

FIG. 6 shows an example of the structure of a general log database (hereinafter referred to as a "log structure").

The log structure shown in FIG. 6 is a data structure corresponding to a single entry of the all-players log DB 122 (FIG. 3).

That is, the all-players log DB 122 can be defined as a collection of logs with the log structure in FIG. 6.

The log structure shown in FIG. 6 is constituted of three elements, namely, event_type, timestamp, and contents. event_type is a character string that indicates the kind of an event that the log records. timestamp is a timestamp that indicates a time when the event corresponding to the log occurred. contents is a sub-structure that defines the content of log information. The content of log information is defined as an array of pairs consisting of a key and a value.

FIG. 7 shows a specific example of a single entry of a log with the log structure in FIG. 6.

In the example in FIG. 7, event_type (the kind of an event) is battleAttack. timestamp (a time when the event corresponding to the log occurred) is defined as 2015/02/02 21:36:59:23.

In addition, the content of the event is defined, as follows, as attributes of the contents sub-structure. That is, it is defined that character is player character 1, characterAttribute is water attribute, targetEnemy is enemy monster 2, and given damage is 2100.

Attributes included in the contents sub-structure change according to the attribute value of event_type of the log structure.

FIG. 8 shows a specific example of a single entry of a log with the log structure in FIG. 6. The entry is generated in the case where a player heals the physical power of a fellow character by using a healing spell or a healing item.

In the example in FIG. 8, event_type (the kind of an event) is battleHeal. timestamp (the time when the event corresponding to the log occurred) is defined as 2015/02/02 21:37:11:43.

In addition, the content of the event is defined, as follows, as attributes of the contents sub-structure. That is, it is defined that character is player character 2, characterAttribute is light attribute, target is player character 4, method is healing magic, and heal, which indicates a healing amount, is 1000.

In the invention proposal of the above-described log structures shown in FIGS. 6 to 8, an example of defining log information as a flexible structure in which the structure thereof can be identified by using a character string of event_type is shown.

As a different implementation from this example, an implementation method in which all attributes are listed in advance and are associated with table attributes in a relational database may be used.

By adopting such a log structure, ranking aggregation can be implemented as an operation of extracting entries to be aggregated from logs accumulated in a database (the all-players log DB 122 in FIG. 3) at a server 2 side providing a game service.

As a specific example of the implementation, a ranking criterion can be defined as a data structure constituted of three pieces of information, as shown below.

Ranking criterion={aggregation duration, target score, bonus information}

Aggregation duration is data indicating a duration, such as Daily, Monthly, and Total (the cumulative total of all durations).

Target score is data indicating a score to be aggregated, for example, "damage points given by using a water attribute weapon/ability."

Bonus information is data indicating a bonus given to a player in the case where the player is ranked higher (e.g., ranked within top three players) in the ranking. For example, "Acquires one healing item A when a battle is started" is conceivable as a bonus.

That is, a score calculation method (score aggregation method) predefined for the above-described ranking criterion refers to a calculation method that uses these three pieces of information.

FIG. 9 shows a specific example of the implementation of a ranking criterion, that is, an example of a structure that defines a ranking criterion (hereinafter referred to as a "rank structure").

That is, a ranking criterion can be defined as a rank structure as shown in FIG. 9.

In the example in FIG. 9, among the three pieces of information constituting a ranking criterion, an aggregation duration is represented as duration_begin and duration_end. duration_begin is a 64-bit integer indicating a start time of a target aggregation duration. duration_end is a 64-bit integer indicating an end time of the target aggregation duration.

In addition, among the three pieces of information constituting a ranking criterion, a target score is defined by targets and query. That is, attributes to be aggregated are defined as an array of attribute names in the log structure described above by referring to FIGS. 6 to 8 as examples. Here, a prominent feature of the rank structure in FIG. 9 is that conditions for logs to be aggregated are specified by using pairs consisting of attribute names (key) and values (value), which are generally known as key-value pairs. The sub-structure that defines these key-value pairs is the query structure.

Specifically, for example, in the case where "damage points given by using a water attribute weapon/ability" is to be aggregated, the condition therefor is "a water attribute weapon/ability", and thus, a ranking criterion with a rank structure having the query structure defined as shown in FIG. 10 is used.

FIG. 10 shows a specific example of a single entry for a ranking criterion with the rank structure in FIG. 9.

In the example in FIG. 10, in the query structure, event_type=battleAttack specifies that logs recorded during battles are to be aggregated. In addition, characterAttribute=water attribute specifies that operations performed by using a water attribute weapon or ability are to be aggregated. In addition, targets: {damage} specifies that values of damage given to enemies under the above-described conditions are to be aggregated.

By using a ranking criterion with the rank structure in FIG. 10, it becomes possible for the ranking rank identification unit 103 and the predicted rank calculation unit 111 to aggregate, when calculating a score for the ranking criterion, only "damage points given by using a water attribute weapon/ability" from play logs accumulated in the all-players log DB 122 (FIG. 3).

The predicted rank calculation unit 111 of the ranking criterion recommendation unit 104 calculates a rank, that is, a predicted rank that a subject player who has play logs with the above-described log structures shown in FIGS. 6 to 8 is expected to acquire in the case where the player participates in a subject ranking criterion with the rank structures shown in FIGS. 9 and 10.

The predicted rank calculation unit 111 sequentially sets each of at least some of the m kinds of ranking criteria as a subject ranking criterion and iterates the processing steps described above, thereby calculating, with respect to the subject player, a predicted rank for each of the at least one of the m kinds of ranking criteria.

Then, the recommended ranking criterion determination unit 112 sorts ranking criteria in, for example, descending order of the predicted rank, that is, in descending order of possibility to be ranked higher, and on the basis of the sorting result, determines ranking criteria to be recommended to the subject player.

Figure 11:
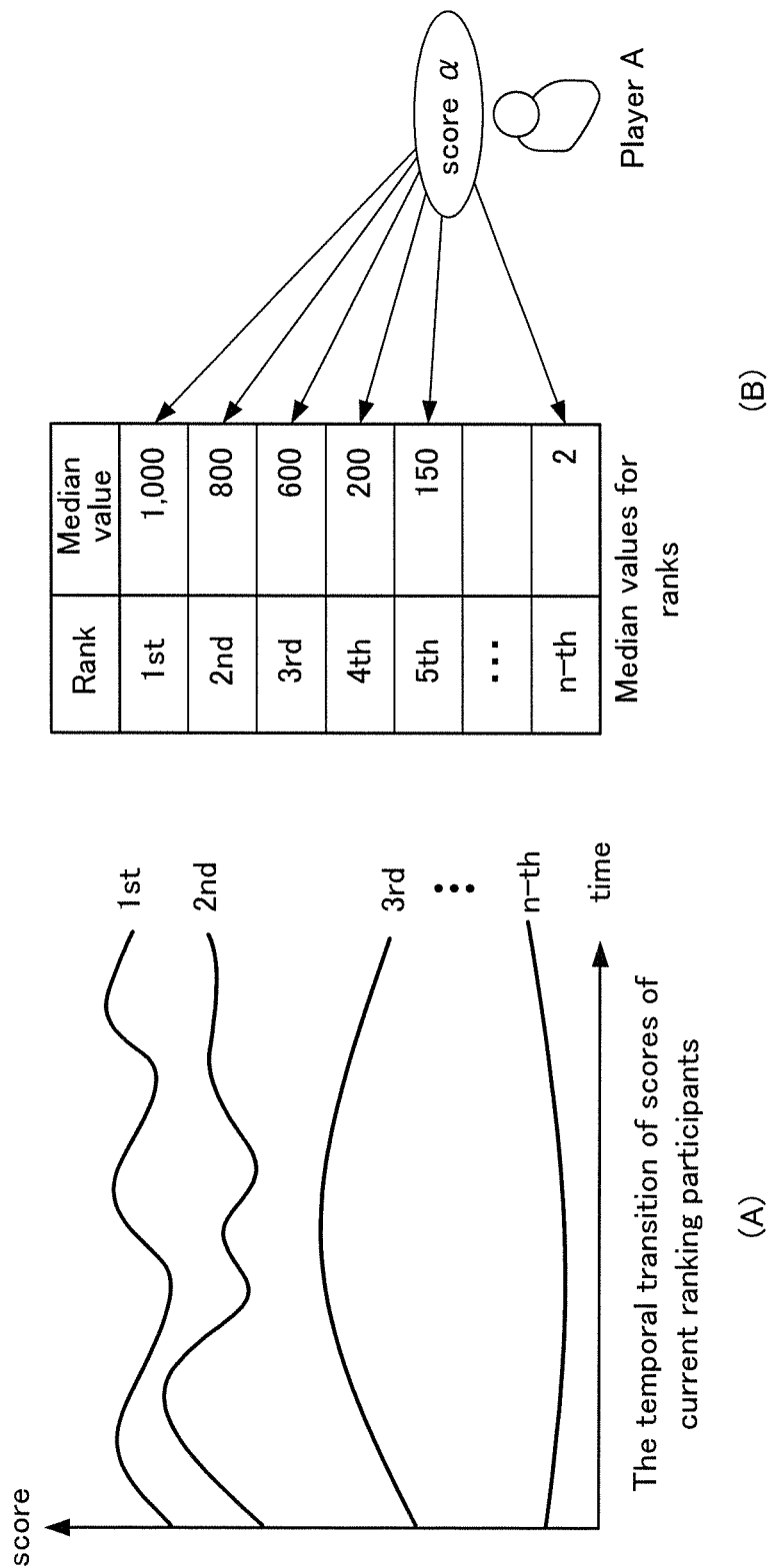
FIG. 11 is an illustration for explaining an example of a method of calculating a predicted rank of a subject player in the case where a subject ranking criterion is a ranking criterion in which the subject player has not participated yet.

FIG. 11 is an illustration for explaining an example of a method of calculating a predicted rank of a subject player (player A) in the case where a ranking criterion that the subject player has not participated in yet is set as a subject ranking criterion.

FIG. 11(A) shows the temporal transition of scores of ranking participants at the time of calculating predicted ranks (hereinafter referred to as "current") for the subject ranking criterion.

As shown in FIG. 11(A), in the subject ranking criterion, the value of a score required to acquire a specific rank (e.g., the 1st place) varies depending on the aggregation timing. Thus, in order to estimate a rank that a specific player may acquire in the subject ranking criterion, a score required to acquire each of the 1st place to the n-th place needs to be estimated.

Although there is no particular limitation to the method of calculating this estimation as long as the method uses the time-series past score logs, in this embodiment, a method of calculating median values of score logs corresponding to individual ranks within a predetermined time range in the past is adopted.

Score logs for individual ranks (players who acquired the ranks) within the predetermined time range in the past are stored in the score DB 124 (FIG. 3) in a structure as shown in, for example, FIG. 12.

FIG. 12 shows an example of time-series information of past score logs related to a subject ranking criterion.

As shown in FIG. 11(B), the predicted rank calculation unit 111 calculates a median value for each of the 1st place to the n-th place on the basis of the score history of past participants in the subject ranking criterion.

Specifically, for example, the predicted rank calculation unit 111 executes processing for converting, from the score DB 124, time-series information of score logs for individual ranks, as shown in FIG. 12, into an array of median values for the individual ranks, as shown in FIG. 11(B). Hereafter, the array of these median values will be referred to as "presumed scores p."

Next, the predicted rank calculation unit 111 extracts play logs of the subject player (player A in the example in FIG. 11) from the all-players log DB 122, and calculates a score corresponding to the subject ranking criterion on the basis of the play logs.

The calculation method of the score is similar to the calculation method in the ranking rank identification unit 103. As described above, this embodiment adopts a method of calculating a score corresponding to the subject ranking criterion with the rank structures shown in FIGS. 9 and 10 by using play logs with the log structures shown in FIGS. 6 to 8.

It is to be understood that the subject player's score corresponding to the subject ranking criterion, calculated as described above, will be hereinafter referred to as "current score c."

In addition, the predicted rank calculation unit 111 compares the magnitude relationships between presumed scores p for the 1st place to n-th place (see FIG. 11(B)) and current score c of the subject player (score a of player A in the example in FIG. 11).

The predicted rank calculation unit 111 calculates, as a predicted rank of the subject player, a rank in which current score c is larger than presumed score p, and the difference between presumed score p and current score c is a minimum ($c > p \wedge \mathrm{MIN}\ (c-p)$).

The series of processing steps of the predicted rank calculation unit 111, as described above, is executed each time each of the at least one of the m kinds of ranking criteria is sequentially set as a subject ranking criterion.

As a result, a predicted rank of the subject player is calculated for each of the at least one of the m kinds of ranking criteria.

Here, "each of the at least one of the m kinds of ranking criteria" indicates, for example, that ranking criteria in which the subject player has already been ranked in the 1st place are excluded from candidates for ranking criteria recommended to the subject player, thereby making it possible to always present new ranking criteria to the subject player as recommended ranking criteria.

That is, there is no particular need to calculate predicted ranks for all of the m kinds of ranking criteria. For example, ranking criteria in which the subject player has already been ranked in the 1st place may be excluded from ranking criteria for which the predicted ranks are to be calculated.

The recommended ranking criterion determination unit 112 sorts ranking criteria in descending order of the predicted rank (from higher rank to lower rank) and determines recommended ranking criteria on the basis of the sorting result.

As described above, the server 2 in this embodiment executes processing for achieving a ranking function that uses the m kinds of various ranking criteria, which involves processing for determining recommended ranking criteria.

Thus, the system needs to be designed considering the load during the operation of the server 2.

Regarding this point, the server 2 in this embodiment has a feature wherein the calculation cost for each ranking criterion is much lower than that of, for example, a conventional server that is provided with a conventional ranking function.

This feature is realized because the number of kinds m of the ranking criteria is huge and different ranking criteria need to be presented to each player as recommended ranking criteria, whereby the number of participants in a ranking criterion becomes less than that of the conventional overall ranking.

With this feature, when a calculation related to a ranking criterion is performed, the number of databases to be referred to becomes less, thereby making it possible to significantly reduce the load caused by log aggregation in a distributed database environment.

A specific example of the log aggregation cost is given below.

That is, for example, the cost when a daily ranking is updated every hour in a situation where the number of active players is 1 million and each player participates in five ranking criteria will be examined.

Suppose that each player leaves 100 logs per hour on average.

In this case, the log aggregation cost will be the result of 100 (the number of logs)×5 (the number of participating ranking criteria)×1 million (the number of players)=500 million times of addition processing.

This addition processing can be executed for each player and can be implemented as aggregation processing in a single database (corresponding to the all-players log DB 122 in FIG. 3 in this embodiment) even in a situation where log databases are distributed.

In addition, the intermediate aggregation result is stored in the ranking result DB 123, as described above. This makes it possible to always calculate the latest rank (ranking) only by performing difference calculation.

As described above, in this embodiment, among the m kinds of various ranking criteria, ranking criteria that suit the play style of the player are presented to the player as recommended ranking criteria.

However, it is cumbersome to define all of the m kinds of ranking criteria manually.

Thus, as shown in FIG. 3, the server 2 is provided with the ranking criterion generation unit 106 that has a function for automatically generating a new ranking criterion.

Specifically, the ranking criterion generation unit 106 can automatically generate a new ranking criterion from only a small number of templates, as shown in FIGS. 13 to 15.

FIG. 13 shows an example of a template for automatically generating a ranking criterion related to damage in a game.

In the template in the example in FIG. 13, % ATRRIB-UTES % is expanded according to the kind of attribute information in the game. That is, a different ranking criterion is generated for each attribute.

FIG. 14 is an example application that is different from the example in FIG. 13, that is, an example of a kind of template in which a player who achieved mastery of a specific character is ranked higher.

In the template in the example in FIG. 14, % CHARACTERS % is expanded according to the kind of a fellow character that appears in the game. That is, a different ranking criterion is generated for each character.

FIG. 15 is an example application that is different from the examples in FIGS. 13 and 14, that is, an example of a template for automatically generating a ranking criterion that uses a score not related to damage.

In the example in FIG. 15, a ranking criterion in which healing events occurred during battles are set as targets as specified in query:{event_type=battleAttack}, and the amount of HPs after healing is aggregated as specified in targets:{heal} is generated.

By providing only a small number of templates as shown in FIGS. 13 to 15, etc., it becomes possible to automatically generate various ranking criteria easily on the basis of information that a game system already has.

The functional configuration of the server 2 has been described above.

Next, in the processing executed by the server 2 having such a functional configuration, processing for presenting recommended ranking criteria will be described with reference to FIGS. 16 and 17.

Figure 16:
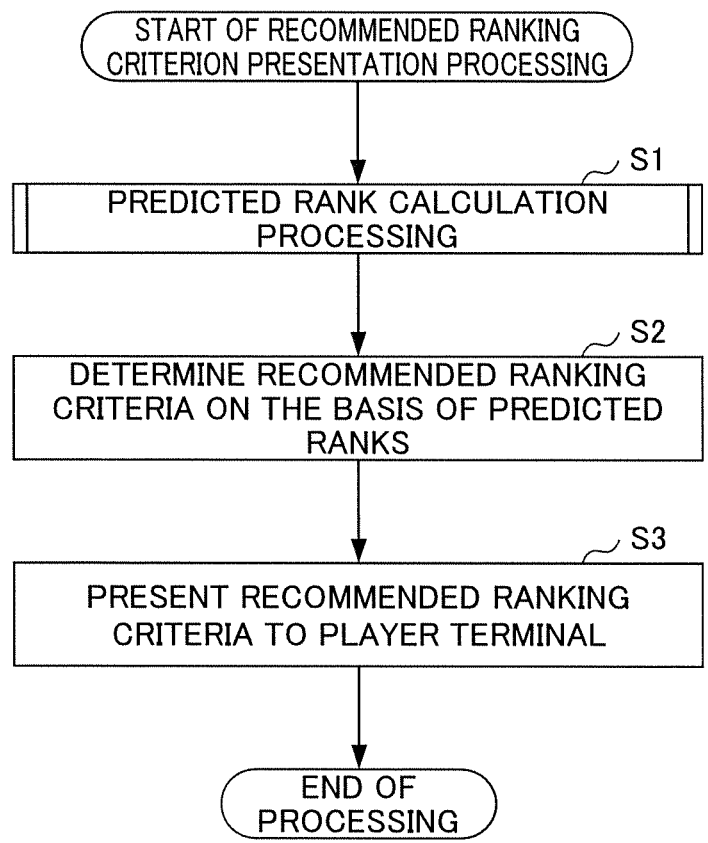
FIG. 16 is a flowchart for explaining an example of the flow of the ranking recommendation processing in the processing of the server having the functional configuration in FIG. 3.

FIG. 16 is a flowchart for explaining the flow of the ranking recommendation processing executed by the server 2.

The ranking recommendation processing is triggered at a predetermined timing, for example, when the automatic selection button 226 in FIG. 4(B) is pressed on a predetermined one of the player terminals 1-1 to 1-n. In this processing, a predetermined player (e.g., a player who pressed the automatic selection button 226) is set as a subject player and the following series of processing steps is executed.

In step S1, the predicted rank calculation unit 111 of the ranking criterion recommendation unit 104 in FIG. 3 calculates a predicted rank for each of the at least one of the m kinds of various ranking criteria.

This kind of processing in step S1 will hereinafter be referred to as "predicted rank calculation processing."

Figure 17:
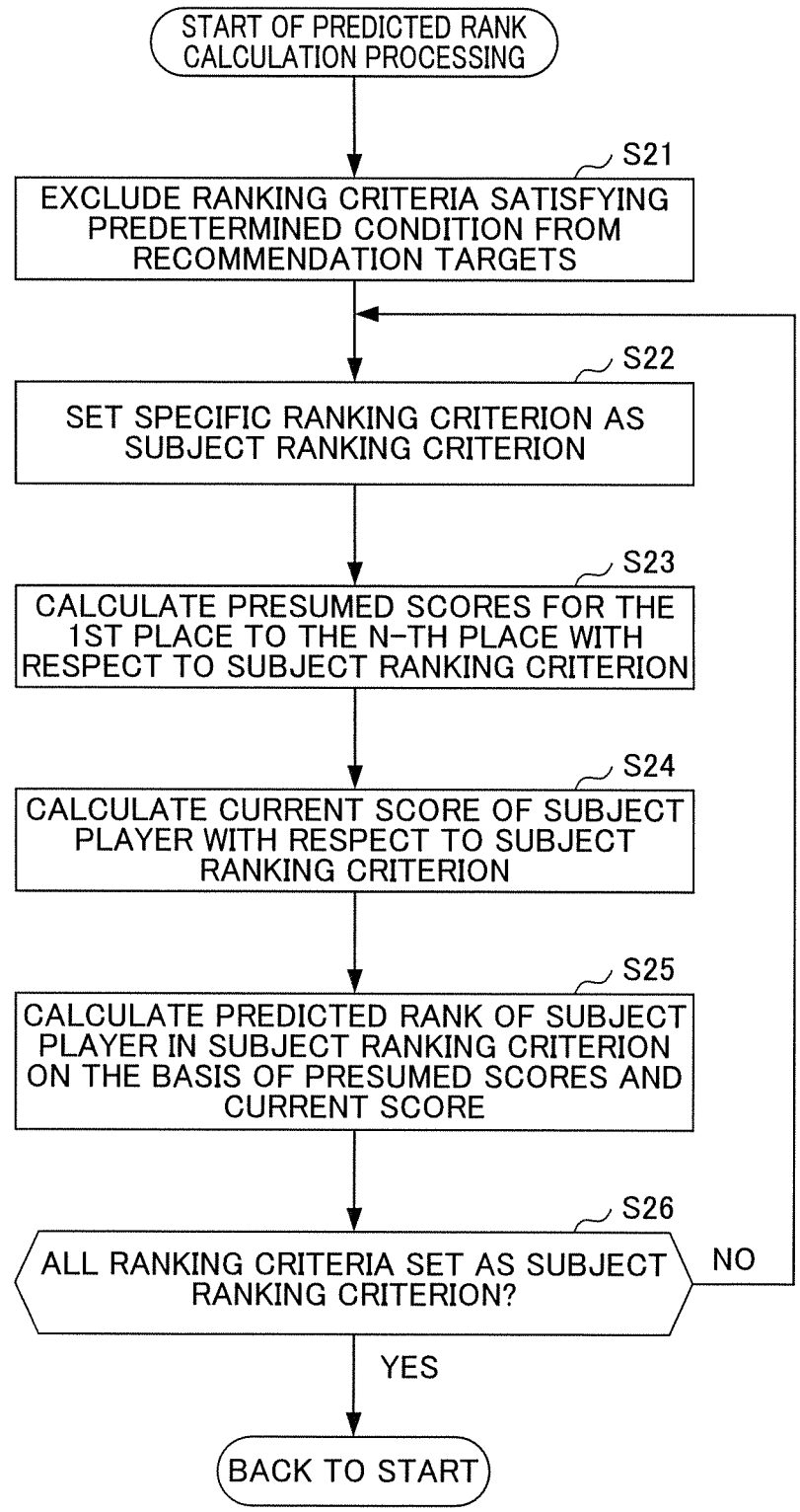
FIG. 17 is a flowchart for explaining an example of details of the predicted rank calculation processing in step S1 of the ranking recommendation processing in FIG. 16.

FIG. 17 is a flowchart for explaining an example of details of the predicted rank calculation processing.

In step S21, the predicted rank calculation unit 111 excludes, among the m kinds of ranking criteria, ranking criteria that satisfy a predetermined condition from recommendation targets.

It is to be understood that the processing in step S21 is unnecessary in the case where all of the m kinds of ranking criteria can be the recommendation targets.

In addition, the predetermined condition for excluding ranking criteria from the recommendation targets is not particularly limited and can be set arbitrarily by a game designer, an administrator of the server 2, etc. For example, as described above, it is possible to adopt the condition that the subject player has already been ranked in the 1st place in the ranking criterion.

In step S22, the predicted rank calculation unit 111 sets, as a subject ranking criterion, a specific ranking criterion other than the ones excluded from the m kinds of ranking criteria in step S21.

In step S23, the predicted rank calculation unit 111 calculates presumed scores p for the 1st place to the n-th place for the subject ranking criterion.

In step S24, the predicted rank calculation unit 111 calculates a current score c of the subject player for the subject ranking criterion.

In step S25, the predicted rank calculation unit 111 calculates a predicted rank of the subject player in the subject ranking criterion on the basis of presumed scores p and current score c.

In step S26, the predicted rank calculation unit 111 determines whether or not all of the ranking criteria other than the ones excluded from the m kinds of ranking criteria in step S21 have been set as a subject ranking criterion.

In the case where there are ranking criteria that have not been set as a subject ranking criterion, the determination in step S26 results in NO, the processing returns to step S22, and the subsequent steps are repeated.

That is, for each of the m kinds of ranking criteria other than the ones excluded in step S21, the loop processing through steps S22 to S26 is repeated, and predicted ranks of the subject player are calculated sequentially.

As a result, since all of the ranking criteria have been set as the subject ranking criteria, the determination in step S26 results in YES, and the predicted rank calculation processing is terminated. Then, the processing proceeds from step S1 to step S2 in FIG. 16.

In step S2, the recommended ranking criterion determination unit 112 of the ranking criterion recommendation unit 104 in FIG. 3 determines recommended ranking criteria from at least some of the m kinds of various ranking criteria on the basis of the predicted ranks.

In step S3, the recommendation result presentation unit 105 presents the recommended ranking criteria to the player terminal 1 of the subject player.

Then, the recommended ranking criterion presentation processing is terminated.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, the functional configuration in FIG. 3 is only an example, and there is no particular limitation to this example. That is, it suffices that an information processing system be provided with functions that enable the execution of the above-described series of processing steps as a whole, and the configuration of functional blocks for implementing the functions is not particularly limited to the example in FIG. 3. Furthermore, the locations of the functional blocks are not particularly limited to those in FIG. 3 and may be arbitrarily set. For example, the functional blocks of the server 2 may be transferred to the terminal 1, etc., and conversely, the functional blocks of the terminal 1, which are not shown in FIG. 3, may be transferred to the server 2, etc.

Furthermore, each functional block may be implemented by hardware alone, by software alone, or by a combination of hardware and software.

In the case where the processing of each functional block is executed by software, a program constituting the software is installed on a computer, etc. via a network or from a recording medium.

The computer may be a computer embedded in special hardware. Alternatively, the computer may be a computer that can execute various kinds of functions when various kinds of programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player as embedded in the main unit of the apparatus, etc.

In this specification, steps dictated in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

In other words, a server in an information processing system to which the present invention is applied, including the server 2 as an embodiment of FIG. 2 or 3 described above, can take the form of various kinds of embodiments having a configuration described below.

That is, a server to which the present invention is applied (e.g., the server 2 in FIG. 1) is a server that individually communicates with a plurality of terminals (e.g., the player terminals 1-1 to 1-n in FIG. 1) that can execute a game by accepting an operation performed individually by a plurality of players, manages a plurality of kinds of ranking criteria in which at least one of the plurality of players participates as a participant, and calculates ranking of the participant for each of the plurality of kinds of ranking criteria, the server including:

a prediction means (e.g., the predicted rank calculation unit 111 in FIG. 3) that sets, among the plurality of players, a player who is to be a subject of processing as a subject player and calculates, as predicted ranks, ranks for at least some of the plurality of kinds of ranking criteria for the case where the subject player participates in the individual ranking criteria;

a determination means (e.g., the recommended ranking criterion determination unit 112 in FIG. 3) that determines, as recommended ranking criteria, ranking criteria to be recommended to the subject player on the basis of the predicted ranks; and a presentation means (e.g., the recommendation result presentation unit 105 in FIG. 3) that presents the recommended ranking criteria to the terminal of the subject player.

This makes it possible to provide overwhelmingly more kinds (m kinds) of ranking criteria than ever before to each player and strongly motivate players to participate in the recommended ranking criteria among these ranking criteria.

That is, by providing overwhelmingly more kinds (m kinds) of ranking criteria than ever before to each player, it is possible to provide ranking criteria in which even casual players have a chance to be ranked higher depending on their play styles, that is, ranking criteria that suit the play style of each player.

However, it is very difficult for each player to find out ranking criteria that suit his/her play style from overwhelmingly more kinds (m kinds) of ranking criteria than ever before.

Thus, a server to which the present invention is applied automatically determines, as recommended ranking criteria, ranking criteria that suit the play style of the subject player, in other words, ranking criteria in which the subject player is expected to be ranked higher (to acquire a higher rank) in the case where the player participates in the ranking criteria. Then, the server presents the recommended ranking criteria to the terminal of the subject player.

That is, for each player, ranking criteria that suit his/her play style are presented from the server as recommended ranking criteria without having to search for the ranking criteria by himself/herself. In this way, it becomes possible for each player to easily and immediately select, from m kinds of various ranking criteria, ranking criteria in which he/she is expected to be ranked higher depending on his/her play style.

This makes it possible to motivate many casual players to participate in rankings.

In addition, a server to which the present invention is applied can be realized at a lower operational cost than before.

That is, the calculation cost for each ranking criterion is much lower than that of the conventional rankings. This is because the number of kinds of ranking criteria is overwhelmingly more than ever before and different ranking criteria are recommended to each player, whereby the number of players participating in each ranking criterion becomes less than that of the conventional overall ranking.

Thus, when a calculation related to a ranking criterion is performed, the number of databases to be referred to becomes less, thereby making it possible to significantly reduce the load caused by log aggregation in a distributed database environment.

In addition, various new ranking criteria managed by the server to which the present invention is applied do not interfere with the existence of the conventional overall ranking. That is, although many ranking criteria are used such that ranking criteria in which even casual players have a chance to be ranked higher can be selected depending on their various play styles, the conventional overall ranking is also used. Thus, the play styles of existing higher-ranked players are not disturbed.

That is, it becomes possible to motivate many casual players to participate in rankings, and, if the ranking itself gathers more attention, existing higher-ranked players in the conventional overall ranking will also be motivated.

Therefore, the rankings that use various ranking criteria managed by the server to which the present invention is applied and the conventional overall ranking are in a complementary relationship.

In addition, the rankings that use various ranking criteria managed by the server to which the present invention is applied provide high playability.

That is, as described above, the server to which the present invention is applied automatically recommends ranking criteria according to a different play style for each player. This makes it possible for each player to easily select, from many ranking criteria, ranking criteria that suit his/her play style.

This makes it possible to prevent an inclination in the number of participants toward only specific ranking criteria.

In addition, the rankings that use various ranking criteria managed by the server to which the present invention is applied make it possible to realize a ranking from a specific viewpoint of "user of character A" among many characters appearing in the game. This leads to an evaluation of a superior play style with a particular uniqueness, such as the heavy use of "character A." As a result, an effect of increasing the variety of ways to enjoy the game title is achieved.

In addition, various ranking criteria managed by the server to which the present invention is applied can be set, for example, for each kind of character or item.

Specifically, for example, various kinds of ranking criteria such as "user of water attribute weapon (ranked according to experience points acquired when a player is equipped with a water attribute weapon)", "master of character A (ranked according to a cumulative total of damage given to enemies by using character A)", "master of healing skill B (ranked according to a cumulative total of HPs healed by using healing skill B)" can be set.

In addition, these ranking criteria can be combined so as to easily define another new ranking criterion. For example, it is possible to define "master of collaboration between character C and character D (ranked according to a cumulative total of damage given to enemies in a state in which character C and character D are organized to be in the same party)".

It is also possible to associate so-called play-videos with a ranking that uses various ranking criteria managed by the server to which the present invention is applied. In this case, it becomes possible for each player to immediately obtain videos of "experts having a play style in which the player is interested" and to compete with each other.

In addition, for example, by providing a way by which it is possible to view the play-videos of the higher-ranked players in the ranking with increased variety from the user interface of the ranking (see FIG. 4), it is possible to create new ways of enjoying games. For example, superior plays of the player ranked in the 1st place in "user of character A" can be learned by players who use the same character.

Here, the determination means can determine one or more ranking criteria for which the predicted rank thereof satisfies a predetermined condition as the recommended ranking criteria, and the presentation means can sort the one or more recommended ranking criteria in descending order of the predicted rank and presents the recommended ranking criteria to the subject player.

As described above, one or more kinds of recommended ranking criteria are presented to the subject player in order of recommendation. Thus, each player can easily and immediately select, from m kinds of various ranking criteria, suitable ranking criteria in which he/she is expected to be ranked higher depending on his/her play style.

In addition, the server to which the present invention is applied further includes an identification means (e.g., the ranking rank identification unit 103 in FIG. 3) that iterates, for each of the plurality of kinds of ranking criteria, processing in which individual scores of one or more participants participating in a specific ranking criterion are calculated according to a score calculation method predefined for the specific ranking criterion, and individual ranks of the one or more participants are identified on the basis of the scores, and the prediction means can:

set a ranking criterion that is to be a subject of processing as a subject ranking criterion among the plurality of kinds of ranking criteria;

set, on the basis of a plurality of past scores in the subject ranking criterion, presumed scores for the 1st place to the n-th place that are presumed as criteria for a predicted rank (e.g., step S23 in FIG. 17);

calculate a current score of the subject player according to a score calculation method predefined for the subject ranking criterion (e.g., step S24 in FIG. 17); and calculate the predicted rank of the subject player on the basis of the presumed scores for the 1st place to the n-th place and the current score of the subject player (e.g., step S25 in FIG. 17).

This makes it possible to accurately calculate the predicted rank of the subject player. As a result, it becomes possible to present more suitable recommended ranking criteria to the subject player.

In addition, the prediction means can exclude, from the subject ranking criteria, ranking criteria that satisfy a predetermined condition among the ranking criteria in which the subject player participated in the past.

Here, the predetermined condition for excluding ranking criteria from the candidates for the recommended ranking criteria (subject ranking criteria) is not particularly limited and can be set arbitrarily by a game designer, an administrator of the server, etc. For example, it is possible to adopt the condition that the subject player has already been ranked in the 1st place in the ranking criterion.

By adopting such a condition, it becomes possible to present, as recommended ranking criteria, ranking criteria in which the subject player has not been ranked in the 1st place but has a high possibility to be ranked higher (has a chance to be ranked higher) to the subject player. As a result, the subject player will be motivated to play the game.

REFERENCE SIGNS LIST 1, 1-1 to 1-*n* Player terminals
2 Server
51 CPU
101 Ranking participation management unit
102 Time management unit
103 Ranking rank identification unit
104 Ranking criterion recommendation unit
105 Recommendation result presentation unit
106 Ranking criterion generation unit
111 Predicted rank calculation unit
112 Recommended ranking criterion determination unit
121 Participating ranking criterion DB
122 All-players log DB
123 Ranking result DB
124 Score DB
125 Ranking criterion DB

The invention claimed is:

1. A server that individually communicates with a plurality of terminals that execute a game by accepting an operation performed individually by a plurality of players, manages a plurality of kinds of ranking criteria in which at least one of the plurality of players participates as a participant, and calculates ranking of the participant for each of the plurality of kinds of ranking criteria, the server comprising:
a processor coupled to a memory, the processor setting, among the plurality of players, a player who is to be a subject of processing as a subject player,
wherein the processor determines a play style of the subject player automatically using a plurality of play logs from one or more games, and
wherein the processor calculates, as predicted ranks, ranks with respect to at least some of the plurality of kinds of ranking criteria for the case where the subject player participates in the individual ranking criteria based on the play style of the subject player, and
wherein the processor determines, as recommended ranking criteria, ranking criteria recommended to the subject player on the basis of the predicted ranks; and
a display that presents the recommended ranking criteria to the terminal of the subject player,
wherein the processor obtains a selection of a predetermined ranking criterion from the subject player in response to presenting the recommended ranking criteria on the display.

2. The server according to claim 1, wherein the processor determines one or more ranking criteria for which the predicted rank thereof satisfies a predetermined condition as the recommended ranking criteria, and the display sorts the one or more ranking criteria in descending order of the predicted rank and presents the recommended ranking criteria to the subject player.

3. The server according to claim 1, wherein the server is further configured to perform a process by the processor that iterates, for each of the plurality of kinds of ranking criteria, processing in which individual scores of one or more participants participating in a specific ranking criterion are calculated according to a score calculation method predefined for the specific ranking criterion, and individual ranks of the one or more participants are identified on the basis of the scores, and wherein the processor:
sets a ranking criterion that is to be a subject of processing as a subject ranking criterion among the plurality of kinds of ranking criteria;
sets, on the basis of a plurality of past scores in the subject ranking criterion, presumed scores for the 1st place to the n-th place that are presumed as criteria for a predicted rank;
calculates a current score of the subject player according to a score calculation method predefined for the subject ranking criterion; and
calculates the predicted rank of the subject player on the basis of the presumed scores for the 1st place to the n-th place and the current score of the subject player.

4. The server according to claim 3, wherein the processor excludes, from the subject ranking criteria, ranking criteria that satisfy a predetermined condition among the ranking criteria in which the subject player participated in the past.

5. A non-transitory computer readable medium storing a program for causing a computer to execute control processing, the computer controlling a server, the server individually communicating with a plurality of terminals that execute a game by accepting an operation performed individually by a plurality of players, managing a plurality of kinds of ranking criteria in which at least one of the plurality of players participates as a participant, and calculating ranking of the participant for each of the plurality of kinds of ranking criteria, the control processing comprising:
setting, by a processor coupled to a memory and among the plurality of players, a player who is to be a subject of processing as a subject player,
determining by the processor, a play style of the subject player automatically using a plurality of play logs from one or more games, and
calculating, by the processor, as predicted ranks, ranks with respect to at least some of the plurality of kinds of ranking criteria for the case where the subject player participates in the individual ranking criteria based on the play style of the subject player;
determining by the processor, as recommended ranking criteria, ranking criteria recommended to the subject player on the basis of the predicted ranks;
presenting, on a display, the recommended ranking criteria to the terminal of the subject player; and
obtaining, by the processor, a selection of a predetermined ranking criterion from the subject player in response to presenting the recommended ranking criteria on the display.

* * * * *